United States Patent [19]

Hanyu et al.

[11] Patent Number: 5,010,396
[45] Date of Patent: Apr. 23, 1991

[54] TELEVISION PROJECTOR FOR PROJECTION DISPLAY

[75] Inventors: Masaaki Hanyu; Yukio Ozaki, both of Tokyo, Japan

[73] Assignee: Pioneer Electronic Corporation, Tokyo, Japan

[21] Appl. No.: 514,803

[22] Filed: Apr. 26, 1990

[30] Foreign Application Priority Data

Jul. 31, 1989 [JP] Japan ................... 1-196927

[51] Int. Cl.⁵ .............................................. H04N 9/31
[52] U.S. Cl. ........................................ 358/60; 358/61; 358/62; 358/64
[58] Field of Search ................ 358/60, 61, 62, 64, 358/29; 350/438

[56] References Cited

U.S. PATENT DOCUMENTS

| | | | |
|---|---|---|---|
| 3,004,099 | 10/1961 | Harries | 358/29 |
| 4,376,949 | 3/1983 | Rowe | 358/60 |
| 4,621,294 | 11/1986 | Lee | 358/60 |
| 4,679,069 | 7/1987 | Andrea | 358/60 |
| 4,714,956 | 12/1987 | Yin | 358/60 |
| 4,766,498 | 8/1988 | Spruit | 358/64 |
| 4,807,014 | 2/1989 | Van Gorkum | 358/60 |

Primary Examiner—John K. Peng
Assistant Examiner—Sherrie Hsia
Attorney, Agent, or Firm—Sughrue, Mion, Zinn, Macpeak & Seas

[57] ABSTRACT

A TV projector for a three-tube projection display which projects a red picture, a green picture and a blue picture by three TV projectors. The TV projector comprises a projection TV CRT and a compound lens including a component lens containing a light-absorbing substance capable of absorbing light components of the corresponding color picture in the sideband of the spectrum of the color picture. The TV projector is capable of projecting individual monochromatic color pictures of high purity to display a high-contrast color pictures having no color shade on a screen.

6 Claims, 3 Drawing Sheets

TELEVISION PROJECTOR FOR PROJECTION DISPLAY

BACKGROUND OF THE INVENTION

1. Field of the Invention

The present invention relates to a television (hereinafter, abbreviated as "TV") projector for projection display and, more specifically, to an improved TV projector for so-called three-tube projection display employing three projection TV cathode-ray tubes (hereinafter, abbreviated to "CRTs") for projecting red, green and blue color pictures, respectively.

2. Description of the Prior Art

Shown in FIG. 4 is a conventional three-tube rear projection display system employing a red picture projection TV CRT (hereinafter, referred to as "R projection TV CRT") 10R for projecting a red picture, a green picture projection TV CRT (hereinafter, referred to as "G projection TV CRT") 10G for projecting a green picture, and a blue picture projection TV CRT (hereinafter, referred to as "B projection TV CRT") 10B for projecting a blue picture, and three projection lenses 20R, 20G and 20B for focusing the red, green and blue pictures, respectively, on the back surface of a screen 30 so that the red, green and blue pictures are synthesized in an enlarged color picture which can be seen on the front surface of the screen 30.

The R projection TV CRT 10R, the G projection TV CRT 10G and the B projection TV CRT 10B have different luminescent characteristics, respectively. The luminescent characteristic of the G projection TV CRT 10G, in particular, has a sideband in the vicinity of 580 nm and 625nm as indicated by a continuous line A in FIG. 5, which are in the region of the red frequency band. Since this sideband reduces the color purity of the green picture, the green picture projected by the G projection TV CRT is tinged with yellow and is displayed in an yellow-green picture. When the red picture, the blue picture and the yellow-green picture are synthesized on the screen 30, a color picture of unsatisfactory color balance is displayed on the screen 30. Accordingly, a component lens of the G projection lens 20G is coated with a dichroic filter having a filtration characteristic for showing light transmissivity thereof as indicated by an alternate long and short dash line B in FIG. 5 to improve the color purity of the green picture.

However, when the G projection lens 20G including a component lens coated with a dichroic filter is used, light cut off by the dichroic filter is reflected by the G projection lens 20G projection TV CRT 10G to illuminate the front glass plate of the G projection TV CRT to deteriorate the contrast of the green picture. Furthermore, since the filtration characteristic of the dichroic filter is dependent on the angle of incidence of light, the filtration characteristic varies with the angle of incidence of light causing color shade in the color picture displayed on the screen.

SUMMARY OF THE INVENTION

Accordingly, it is an object of the present invention to provide an improved projector for three-tube projection display, employing an improved projection lens, and capable of projecting a color picture of high color purity and satisfactory contrast to display a color picture having no color shade on a screen.

To achieve the object, the present invention provides a projector for three-tube projection display, compring a projection lens capable of suppressing reflection and containing a light-absorbing substance capable of absorbing light components having a sideband in the luminescent characteristic of the corresponding projection TV CRT to eliminate color shade and to project a color picture of high color purity by absorbing the above light components so that a color picture of satisfactory contrast may be displayed on a screen.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

Figure 1:
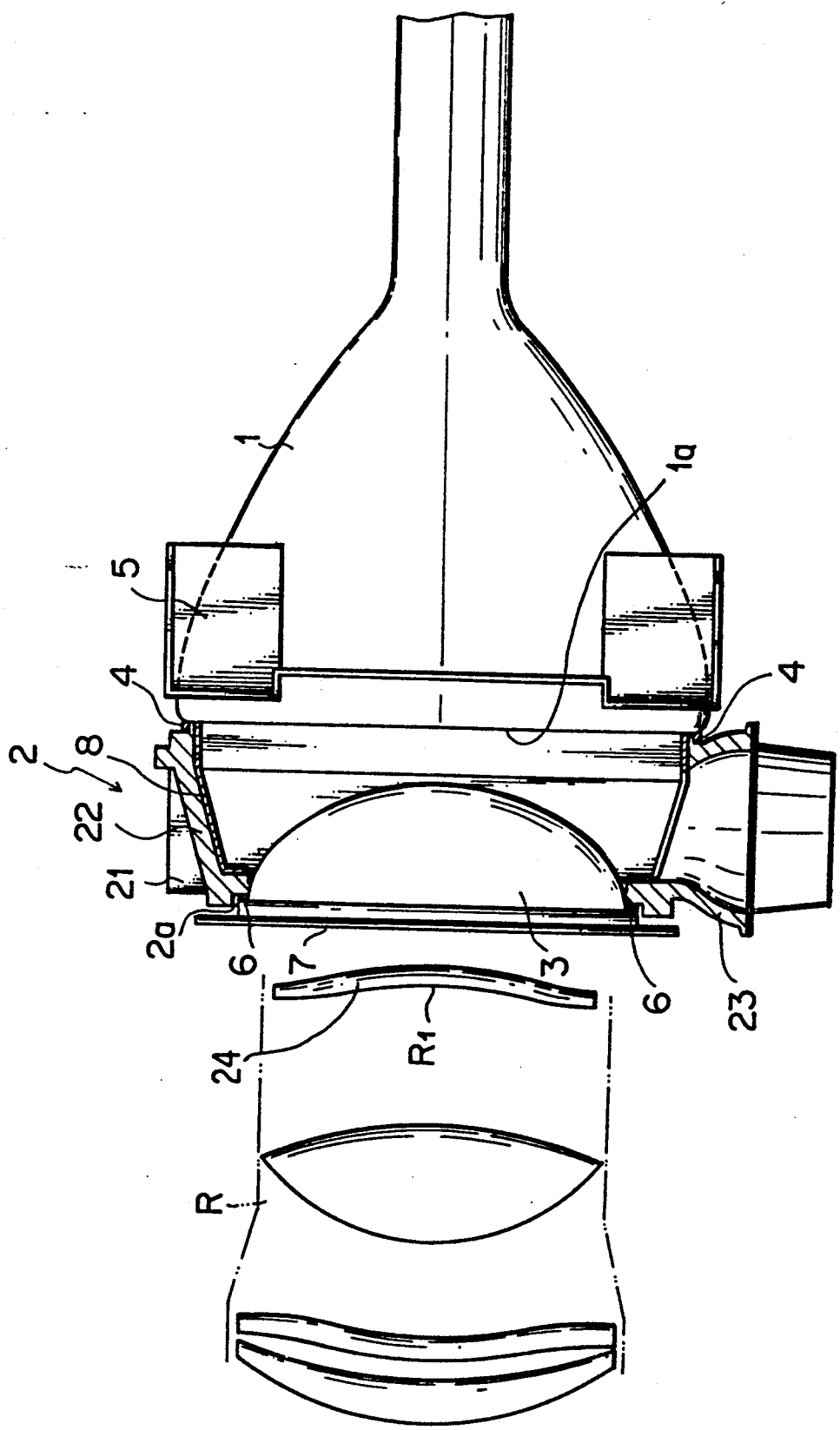
FIG. 1 is a side elevation of a projector in a preferred embodiment according to the present invention.
Figure 2:
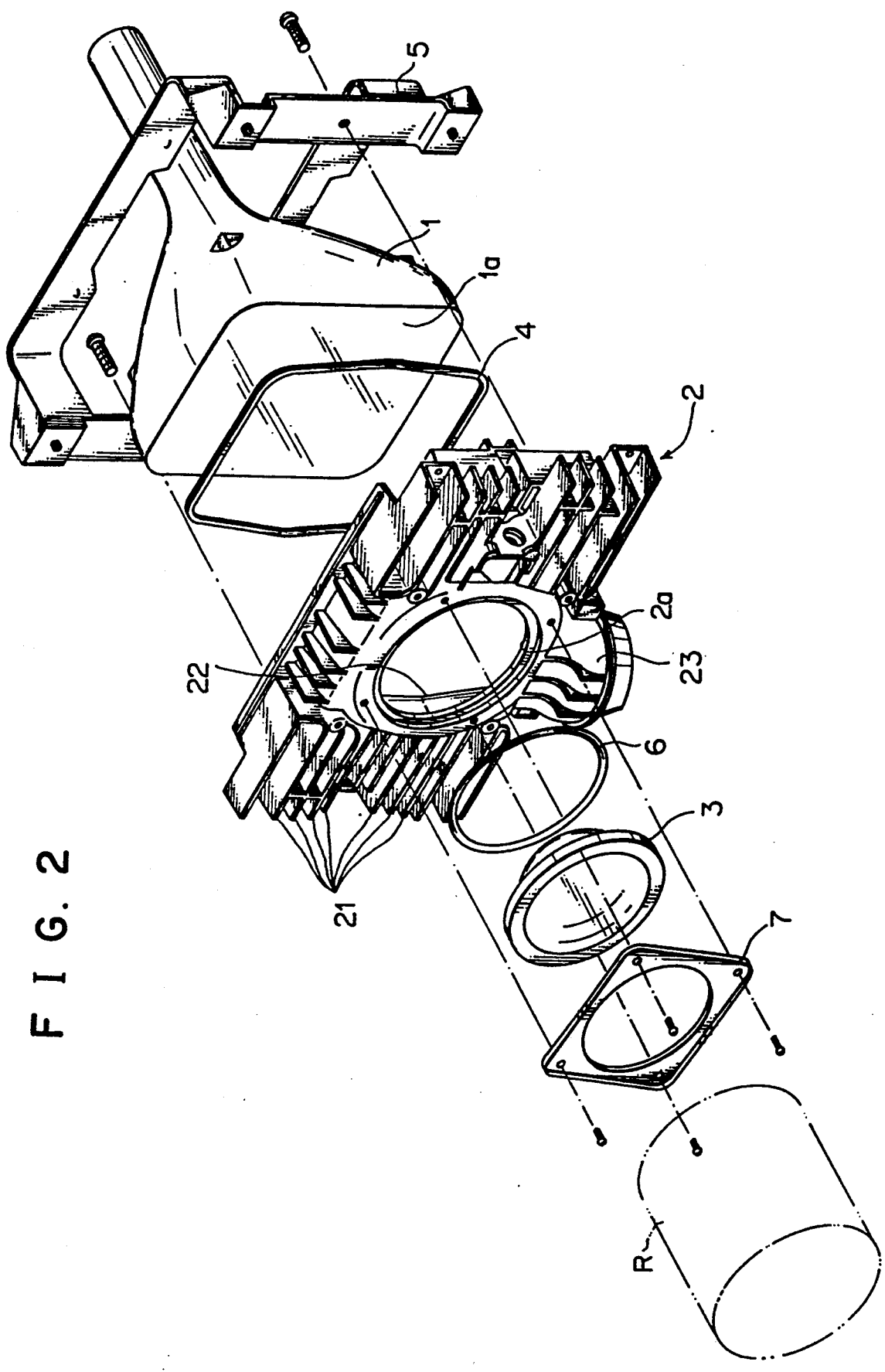
FIG. 2 is an exploded perspective view of the projector of FIG. 1.
Figure 4:
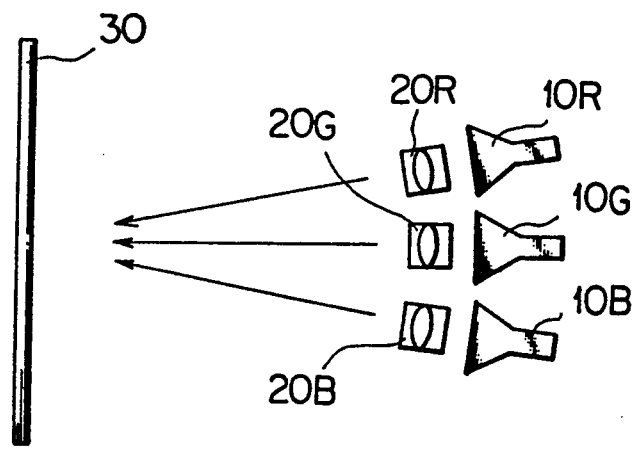
FIG. 4 is a diagrammatic illustration of a conventional three-tube projection TV display.
Figure 5:
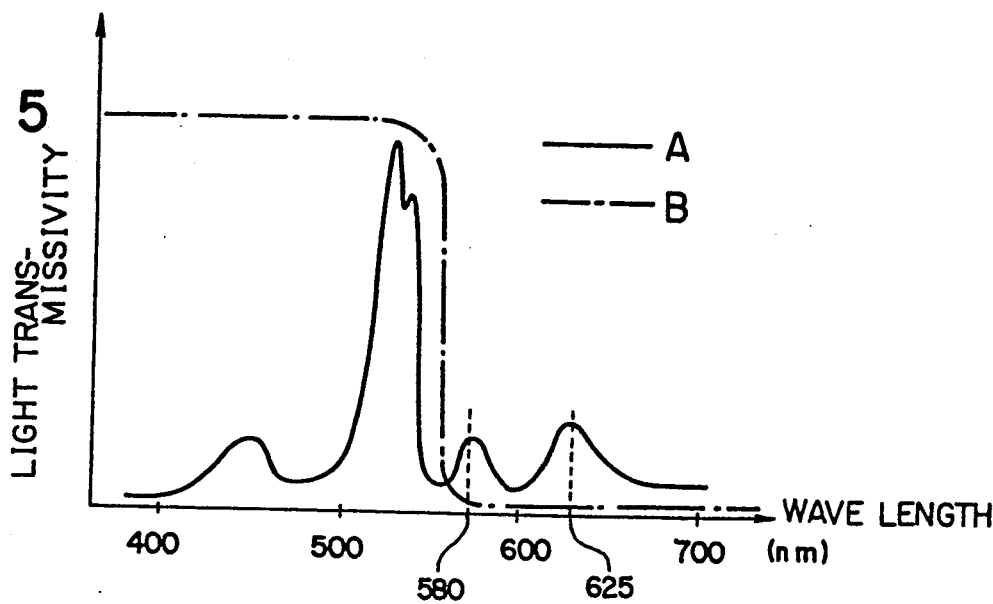
FIG. 5 is a graph showing the filtering characteristic for indicating light transmissivity of a conventional dichroic filter and the luminescent characteristic of a G projection CRT.

FIGS. 1 and 2 show a G projector for projecting a green picture among the three projectors of a projection system for a three-tube rear projection display, of the type generally illustrataed in FIG. 4. The projection system comprises an R projection TV CRT for projecting a red picture, a G projecting TV CRT for projecting a green picture and a B projection TV CRT for projecting a blue picture, which are similar in construction. FIG. 1 shows a projection TV CRT 1 having a flat front glass plate 1a, a die-cast aluminum coupler 2 provided with a plurality of fins 21, and a meniscus lens 3 formed of a plastic principally for correcting the curvature of an image field. A compound lens R and the meniscus lens 3 constitute a projection lens. An image displayed on the front glass plate 1a of the projection TV CRT is projected through the coupler 2, the meniscus lens 3 and the compound lens R onto a screen, not shown.

The coupler 2 is provided with a circular opening 2a in its central portion to receive the meniscus lens 3, and side walls 22 defining a rectangular space behind the circular opening 2a, namely, on the side of the projection TV CRT with respect to the circular opening 2a. The meniscus lens 3 is seated on a packing 6 provided in the circular opening 2a and is held in place on the coupler 2 with a lens fixing frame 7 screwed to the coupler 2. A space sealed by the projection TV CRT 1, the meniscus lens 3 and the side walls 22 is filled with a cooling liquid to cool the front glass plate 1a and to couple the front glass plate 1a and the meniscus lens optically. Heat transferred from the cooling liquid to the coupler 2 is radiated by the fins 21. A pressure regulating chamber 23 is formed on one of the side walls 22 of the coupler 2 to maintain the pressure of the cooling liquid constant.

Figure 3:
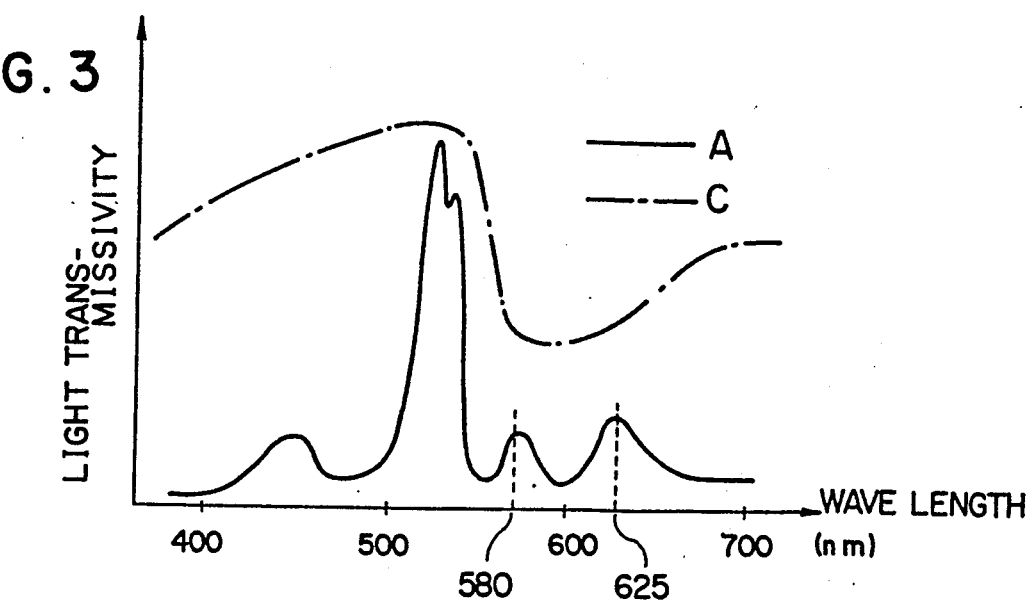
FIG. 3 is a graph showing the filtering characteristic for indicating light transmissivity of a light-absorbing substance and the luminescent characteristic of a G projection TV CRT.

The luminescent characteristic of the projection TV CRT 1, i.e., the G projection TV CRT, is represented by a curve A indicated by a continuous line as shown in FIG. 3. The lens R1 of the compound lens R contains a light-absorbing substance 24 having a filtering characteristic for indicating light transmissivity thereof represented by a curve C indicated by an alternate long and short dash line. The lens R1 absorbs light components in the sideband in the spectrum of a green picture.

Thus, the green picture projected by the projection TV CRT has high color purity. The light-absorbing substance 24 contained in the lens R1 absorbs the light components in the sidebands to prevent the adverse reflection of light on the front glass 1a of the projection TV CRT, so that the contrast of a picture displayed on the screen is improved.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed:

1. A TV projector for a three-tube projection display which projects a red picture, a green picture and a blue picture by three projection TV CRTs through three projection lenses disposed in front of the three projection TV CRTs, respectively, wherein a component lens of at least one of the projection lenses of the TV projector contains a light-absorbing substance capable of absorbing light components of the corresponding color picture in a sideband of the spectrum of the color picture.

2. A TV projector for a three-tube projection display according to claim 1, wherein:
    said component lens of the projection lens disposed in front of said green projection TV CRT contains said light-absorbing substance; and
    said light-absorbing substance contained in said component lens of said green projection TV CRT is capable of absorbing light components in the sideband of the green picture spectrum.

3. A TV projector for a three-tube projection display according to claim 1, wherein:
    said light-absorbing substance prevents said absorbed light components from reflecting back onto a front glass plate disposed on the front of each of said CRTs.

4. A TV projector for a three-tube projection TV according to claim 1, wherein:
    each of said projection lenses comprise a compound lens and a meniscus lens.

5. A TV projector for a three-tube projection TV according to claim 1, wherein:
    said component lens is contained in a compound lens, said compound lens forming part of said projection lens and comprising at lest one lens.

6. A TV projector for a three-tube projection display which projects three, different color, monochrome pictures by three projection TV CRTs through three projection lenses disposed in front of the three projection TV CRTs, respectively, comprising:
    means for absorbing light components in sidebands of the spectrum of the monochrome color pictures wherein said absorbing means prevents said light components from being reflected back towards said projection TV CRT.

* * * * *